Feb. 24, 1970    F. J. KARLE    3,497,603
FURNACE ASSEMBLY FOR THERMAL ANALYSIS USE
Filed July 5, 1968
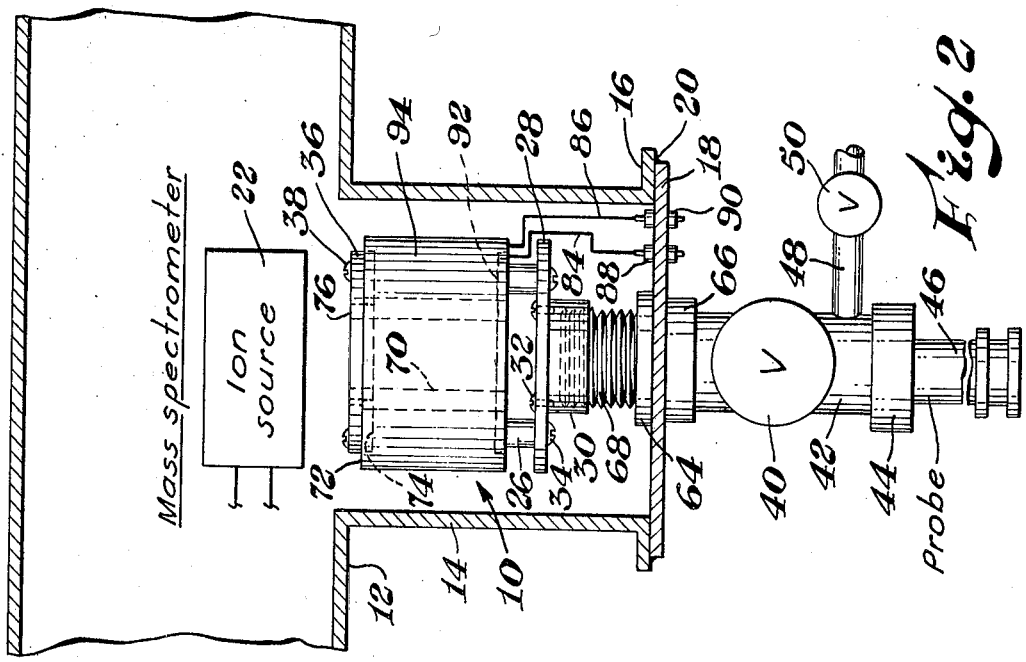
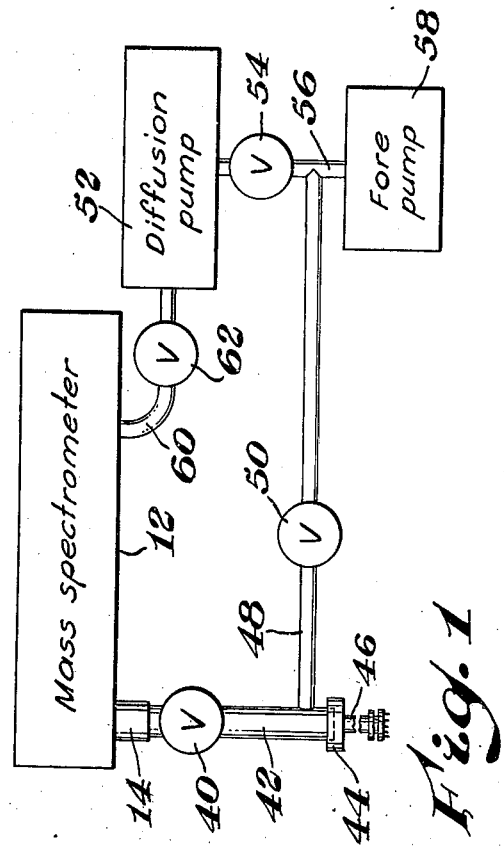
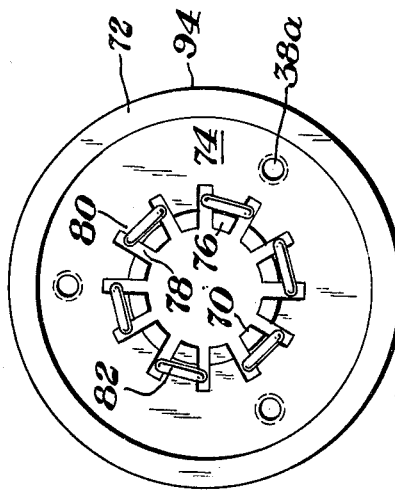
INVENTOR.
Franklin J. Karle
BY Carl D. Ayers
AGENT

United States Patent Office 3,497,603
Patented Feb. 24, 1970

---

3,497,603
FURNACE ASSEMBLY FOR THERMAL ANALYSIS USE
Franklin J. Karle, Midland, Mich., assignor to The Dow Chemical Company, Midland, Mich., a corporation of Delaware
Filed July 5, 1968, Ser. No. 742,868
Int. Cl. H05b 3/26
U.S. Cl. 13—31                               6 Claims

ABSTRACT OF THE DISCLOSURE

A heating furnace and differential thermal analysis cell assembly which is adapted to be coupled to and become a part of a mass spectrometer adjacent to the ion source (usually) within the instrument. The furnace is a radiant heating device adapted to be controlled by means of temperature sensing means disposed within a separate thermal analysis cell which is adapted to be disposed within the furnace.

BACKGROUND OF THE INVENTION

This invention relates to radiant heated furnaces adapted to receive a thermal analysis cell and particularly to furnace and cell insertion assemblies which are adapted for use under high vacuum conditions.

Accordingly, a principal object of this invention is to provide an improved thermal analysis receiving and heating assembly for use under high vacuum conditions.

Another object of this invention is to provide an improved radiant heating furnace and thermal analysis cell receiving assembly for use under high vacuum conditions in a mass spectrometer.

Even though mass spectrometers are sometimes equipped with devices which allow the heating of samples within the confinement of the mass spectrometer vacuum or within the ion source, and even if such devices sometimes also allow the measurement of sample temperatures during the heating process, these devices do not allow the operation known as thermal analysis. In such high vacuum operations it is essential that the sample be heated at a linear predetermined rate of heating, that the sample temperature is known and indicated at all times, and for differential thermal analysis operations the sample temperature is continuously compared with that of an inert material in the same cell. In general, this requires that three thermocouples located in the thermal analysis cell should be precisely at the same temperature at all times unless a chemical reaction occurs in the sample. Thus, it is also of extreme importance that equal heat transfer is guaranteed from the heat source furnace to the thermal analysis cell, that no temperature gradient exists in the cell itself, that fast heat transfer is provided from the cell to the sample and that each thermocouple remains electrically insulated.

In addition, to make a cell useful it must be possible to load a sample into the cell and introduce the cell with the sample into a Mass Spectrometer without shutting down the operation of a Mass Spectrometer or other evacuated systems.

In accordance with this invention, there is provided a furnace which is cylindrical in overall configuration and is supported by thermally insulating elements from a metal disc attached to a valved tubular thermal analysis cell input and sealing assembly.

The furnace has an axial concentric bore extending therethrough which is aligned with the cell input and sealing assembly. The furnace has an array of slots extending radially outwardly from the axial bore and into the body (of thermally insulating material) of the furnace. A heating filament is wrapped around the walls of the slots, with the leads from the filament passing through the metal disc and adapted to be coupled to a controlled energization source (not shown).

The assembly is inserted into a mass spectrometer adjacent to the ion source.

The invention, as well as additional objects and advantages thereof will best be understood when the following detailed description is read in connection with the accompanying drawing, in which:

FIG. 1 is a diagrammatical view showing apparatus in accordance with this invention coupled to a mass spectrometer;

FIG. 2 is a side elevational view, partly in section, of a furnace and cell probe insertion and sealing assembly in accordance with this invention, and FIG. 3 is a plan view of the furnace shown in FIG. 2.

Referring to the drawing, and particularly to FIG. 1, there is shown a mass spectrometer 12 having a tubular member 14 extending perpendicularly therefrom. An additional tubular element 42 having a compression coupling 44 at its outer end and having a ball type vacuum sealing valve 40 adjacent to the member 40 is coupled to the outer end of the member 40. A cell-probe assembly 46 (see FIG. 2) is shown partly inserted into the entry and sealing assembly. A diffusion pump 52 is coupled by means of valve 54 and tube 56 to a fore pump 58 and by means of a tube 60 and valve 62 to the mass spectrometer 12. The tubular element 42 is coupled through tube 48 and valve 50 to the tube 56 between the valve 54 and the fore pump 58.

Referring now to FIGS. 2 and 3, as well as to FIG. 1, there is shown the mass spectrometer tube 12 having a tubular member 14 extending transversely therefrom adjacent to the ion source 22 of the mass spectrometer. The member 14 has an outwardly extending flange 16 at its outer end. A metal plate 18 on which is supported the furnace and cell probe entry and sealing assembly 10 is sealed, as by the fillet 20, for example, to the flange 16. A threaded tube 68 extends transversely through the plate 18 generally in coaxial relationship with the member 14. A tubular element 42 containing a so-called vacuum ball valve 40 is coupled to the tube 68 by means of coupling 66. A seal-nut element 64 seals the tube 68 and element 42 (and coupling 66 against the plate 18 through which the tube 68 passes.

A cap 30 is threadedly coupled to the end of the tube 68 which lies within the tubular member 14. A metal plate, usually copper or brass and of substantially, larger diameter than the diameter of the cap 30 is coupled to the top of the cap 30 by means of screws 32. The body part 94 of the furnace made of boron nitride, usually, is supported on spacers 26 which extend above the plate 28 by means of screws 34. The body 94 is undercut slightly as at 74, 92, leaving an outer peripheral ridge 72 and an inner peripheral ridge 76 adjacent to the bore 70. An array of grooves 78 extends inwardly from the bore 70 along the entire length of the body part 94.

A heater wire 82 is threaded back and forth over the surfaces 74, 92 at the top of and adjacent to each groove 78 (as at 80, for example, in FIG. 3), with the heater wire leads 84, 86 being brought through the plate 18 by feed through insulators 88, 90 respectively.

An annular disc 36 is coupled to the surface 74 by means of screws 38, extending between the ribs 72 and 76.

In operation, with the mass spectrometer pumped down by the diffusion pump 52 and with valves 40 and 54 closed, the cell-prode 46 is inserted in the tubular element 42 between the closed valve 40 and the "opened" compression fitting 44. The compression fitting is then tightened around the tube of the probe 46 and, after a sufficient reduction of pressure by means of the fore pump 58, the valve 50 is closed and ball valve 40 and valve 62 are opened. The cell-probe 46 is then slowly pushed through and past the compression fitting 44, past the valve 40 and into the bore 70 in the furnace body 94. The heating wire 82 is energized at a controlled rate from a controller-energization source (not shown) in coordination with the readings from control thermo-couples in the sample cell-probe assembly 46, as is known to those skilled in the art of differential thermal analysis.

Because of the location of the furnace adjacent to the ion source 22, the material vaporized on heating of the sample material carried in the cell-probe 46 is emitted into the ion source area of the mass spectrometer, where the vaporized material is ionized and analysis of the sample by mass spectrometric mean occurs simultaneously with the differential thermal analysis of the sample. Because of the excellent shielding by the boron nitride body of the furnace, overheating of the ion source and adjacent wall parts may be avoided.

A cell-probe assembly which is especially well adapted for use with this invention is disclosed and claimed in Franklin J. Karle and Horst G. Langer's copending application S.N. 742,869, entitled "Differential Thermal Analysis Cell Assembly," filed concurrently herewith.

What is claimed is:

1. A furnace and sample insertion assembly for use under high vacuum conditions, comprising a first tubular element, said first tubular element having a cap element at one end, a metal disc having a central bore which is at least as large as the inner diameter of said first tubular element, said metal disc being disposed perpendicularly with respect to said first tubular element, an array of spacer elements disposed and secured adjacent to the outer periphery of said metal disc, a generally cylindrical furnace body block made of thermally insulating material having a concentrically disposed bore extending from end to end of said block, said concentrically disposed bore being at least equal in diameter to the inner diameter of said tubular element and arially aligned with said tubular element, said body block being supported on and secured to said array of spacer elements, said body block having symmetrical array of outwardly extending slots communicating with said concentrically disposed bore, and extending from top to bottom of said body block a resistance heating element, said element being wound back and forth through said slots and over and under the adjacent end parts of said body block, said heating element having electrical leads coupled thereto and extending from said body block, a mounting flanged plate, said flange plate extending transversely from said tubular elements intermediate the ends of said tubular element, said flanged being hermetically sealed to said tubular element, a tubular section having a valve therein, said tubular section having an inner diameter which is slightly larger than the diameter of a thermal analysis cell assembly adapted to be inserted therethrough into said concentric bore in said body block, a compression sealing element, said compression sealing element being coupled to the end of said tubular section, valved means coupled to said tubular section between said valve and said compression sealing element for coupling evacuating means to said tubular section, and sealed means coupled to said mounting flanged plate for boring through said electrical leads, said mounting flanged plate being adapted to be sealed to the housing of a mass spectrometer whereby said body block is disposed within said housing.

2. An assembly in accordance with claim 1, wherein the top and bottom ends of said body block are undercut from near to the outer periphery of said block to near to said concentric bore.

3. An assembly in accordance with claim 2, wherein a thermally insulating disc caps the undercut part of the end of said body block which is most remote from said tubular element.

4. An assembly in accordance with claim 1, wherein said body block is made of boron nitride.

5. An assembly in accordance with claim 1, wherein said valve in said tubular section is a ball valve of a vacuum sealable type.

6. An assembly in accordance with claim 1, wherein said spacers are made of a thermally insulating material.

References Cited

UNITED STATES PATENTS

| | | | |
|---|---|---|---|
| 2,766,937 | 10/1965 | Snavely | 136—224 X |
| 3,128,326 | 4/1964 | Hintenberger | 13—22 X |
| 3,348,978 | 10/1967 | Teague | 136—224 X |
| 2,995,658 | 8/1961 | Craig | 250—41.9 |

BERNARD A. GILHEANY, Primary Examiner

H. B. GILSON, Assistant Examiner

U.S. Cl. X.R.

13—22